May 27, 1930.  F. J. PARSONS  1,760,207

HILL LOCK FOR AUTOMOBILES

Filed April 23, 1929

Inventor

Fred J. Parsons

By

Attorney

Patented May 27, 1930

1,760,207

UNITED STATES PATENT OFFICE

FRED J. PARSONS, OF TACOMA, WASHINGTON

HILL LOCK FOR AUTOMOBILES

Application filed April 23, 1929. Serial No. 357,497.

This invention relates to devices to be applied to motor-driven vehicles, especially automobiles and trucks, and has special reference to such devices as have for their purpose the prevention of the unintentional backing up of such vehicle when stopped on an upward grade. The objects of my invention are, first, to provide such a device which is controlled from the steering wheel of the vehicle; second, which is automatically retracted from locking position as soon as the vehicle starts forward; third, which applies the holding stress to the side frames of the chassis; fourth, which provides for the varying position of the propeller shaft in relation to the frame when different loads are applied to the vehicle; and fifth, which is simple to make, easy to apply and effective in use.

I attain these and other objects by the devices, mechanisms, and arrangements illustrated in the accompanying drawings, in which—

Figure 1:
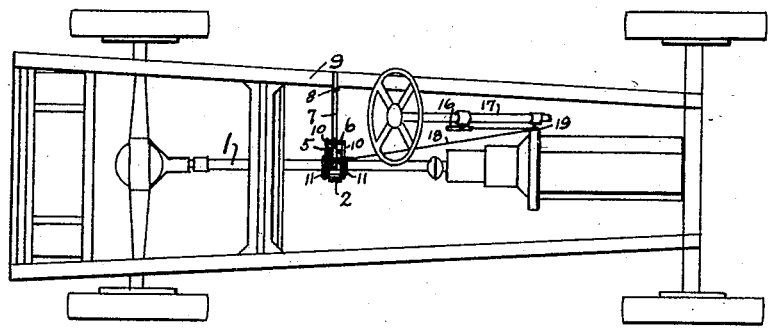
Figure 2:
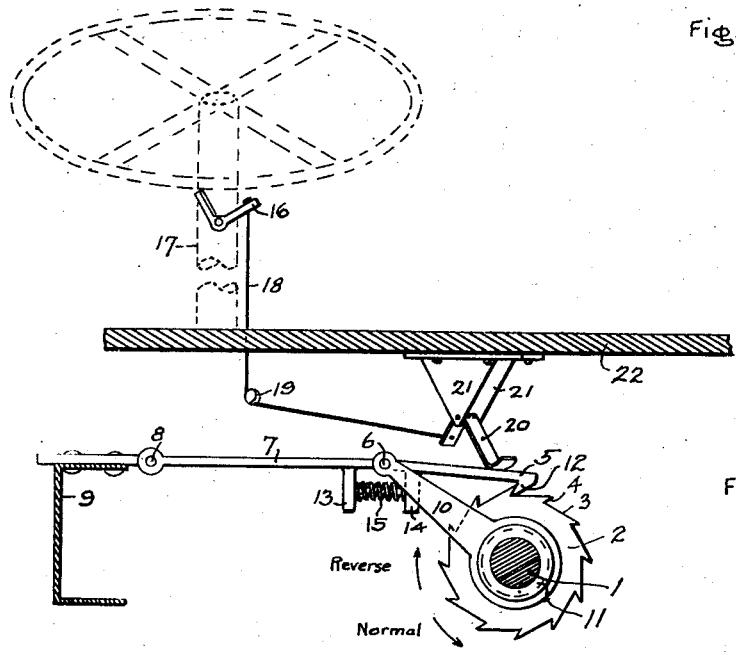

Fig. 1 is a plan view of the chassis of an automobile equipped with my improved apparatus; and Fig. 2 is a diagrammatic view of my apparatus, showing the propeller shaft locked against reversed movement.

Similar numerals of reference refer to similar parts throughout the several views.

When a laden truck stops on an upward grade, either because the traffic signals are against its passage or for any other cause, the brakes are applied and normally hold the machine until it is ready to go forward again, but on slightly loosening the brakes the machine starts to travel backward down the hill, reversing the direction of rotation of the propeller shaft and adding considerable to the difficulty of getting the machine started up the hill as well as adding to the wear of the clutch and other parts before the engine has been able to start it upward again.

My invention locks the propeller shaft against reversed rotation, and therefore locks the machine from receding down the hill, and it holds the locking parts together until the engine has actually started the truck moving forward, at which time it immediately and automatically releases the locking parts from engagement.

Referring to the drawings, it will be seen that I provide the propeller shaft 1, of the automobile, with a toothed ratchet wheel 2. Each tooth of the wheel 2 is arranged with an outwardly inclined back 3 and an inwardly inclined face 4, as shown, said faces 4 being arranged to engage the hereinafter described pawl when the propeller shaft 1 is rotated in reversed direction and after the pawl has been lowered into contact therewith.

The pawl 5 is pivoted at 6 to the end of a bar 7 which is, in turn, pivoted at 8 to the side frame 9 of the chassis. The pivots or hinges 6 and 8 lie substantially horizontally and are adapted to permit vertical movements only of the parts 5 and 7.

The pivot 6 is also attached to the two side brackets or radius arms 10, which extend therefrom to engagement with the shaft 1, or with the bosses 11, on each side of the ratchet wheel 2. Thus it will be seen that as the frame 9 moves up or down in relation to that part of the propeller shaft 1 at which the wheel 2 is mounted, the pivot 6 moves correspondingly. The pawl 5 is therefore held in substantially constant relation to the ratchet wheel 2.

The pawl 5 is provided with a tooth 12 complementary in form to the teeth of the wheel 2. A lug 13 extends downward from the bar 7, near the pivot 6, and a complementary lug 14 extends downward from the pawl 5, near said pivot 6. A compression spring 15 is mounted between said lugs 13 and 14 and holds the end of the pawl 5 up to keep its tooth 12 out of engagement with the wheel 2, except when it is depressed as hereinafter described.

A bell-crank lever 16 is mounted on the steering post 17 of the vehicle. A cable 18 extends from one arm of said lever 16 downward and around a pulley 19 near the base thereof, and thence to a bell-crank lever 20, mounted in a bracket 21 secured to the under side of the floor 22 of the vehicle. The other arm of the lever 20 rests on the pawl 5 at all times and is adapted to bear downward thereon when the operator turns the bell-crank lever 16 to pull the cable 18.

When the operator thus lowers the pawl 5, against the action of the spring 15, the tooth 12 thereof engages the ratchet wheel 2. If the machine is in forward motion, the pawl 5 will simply slide on the successive backs 3 of the teeth of the wheel; if the machine is stopped, it will rest on the back 3 of one of the teeth; and if the machine is moving backward, the reversed motion of the propeller shaft 1 will cause the tooth 12 to engage the face 4 of the next tooth, thus stopping the rotation of the shaft 1 and holding the machine against backward motion. As is readily seen, the undercut form of the tooth 12 and of the teeth of the wheel 2 causes said teeth to draw the pawl 5 towards the shaft 1 and therefore holds the tooth 12 in engagement with the ratchet wheel 2.

When the pawl is thus engaged with the ratchet wheel 2, the tension produced thereby is transferred to the side frame 9 through the bar 7; and the brackets or radius arms 10 brace the propeller shaft 1 from being bent by the lateral strain.

But, as soon as the engine again starts the shaft 1 rotating in the normal or forward direction, the back 3 of the next tooth of the wheel 2 together with the reaction of the compressed spring 15 both cause the pawl 5 to turn on the hinge 6 to raise the tooth 12 out of contact with the wheel 2.

Having, therefore, described my invention, what I claim is:—

In a hill lock for automobiles, the combination with a propeller shaft; a toothed ratchet wheel mounted thereon; a pawl adapted to engage the teeth of said ratchet wheel to hold the shaft from rotation in reversed direction; a bar hinged to the automobile frame and to said pawl; a bracket mounted on the propeller shaft and attached to the hinge between said bar and said pawl; a spring interposed between lugs extending from said bar and said pawl and adapted to raise said pawl out of engagement with the ratchet wheel; and means operable from the steering post of the automobile and adapted to press the pawl into contact with said ratchet wheel against the action of said spring.

FRED J. PARSONS.